United States Patent [19]

Schwarz et al.

[11] Patent Number: 4,461,021

[45] Date of Patent: Jul. 17, 1984

[54] CIRCUIT ARRANGEMENT FOR RECEIVING TWO MODULATING SIGNALS, MORE SPECIFICALLY FOR TELEVISION

[75] Inventors: Henning Schwarz, Reinbek; Ulf H. Buhse, Kollmar, both of Fed. Rep. of Germany

[73] Assignee: U.S. Philips Corporation, New York, N.Y.

[21] Appl. No.: 414,110

[22] Filed: Sep. 2, 1982

[30] Foreign Application Priority Data

Sep. 4, 1981 [DE] Fed. Rep. of Germany ....... 3135060

[51] Int. Cl.³ .......................... H04N 7/04; H04N 5/60
[52] U.S. Cl. ..................................... 381/2; 358/144; 358/198
[58] Field of Search ............... 381/1, 2; 358/143, 144, 358/198

[56] References Cited

U.S. PATENT DOCUMENTS 4,389,536 6/1983 Schickedanz ................... 358/198 X

FOREIGN PATENT DOCUMENTS 2902933 7/1980 Fed. Rep. of Germany ...... 358/144

Primary Examiner—R. J. Hickey
Attorney, Agent, or Firm—Thomas A. Briody; William J. Streeter; Edward W. Goodman

[57] ABSTRACT

Circuit arrangement for receiving two modulating signals, more specifically for television, particularly for the transmission of stereo signals or dual channel independent sound signals, each of the two modulating signal being conveyed through respective variable amplifiers, the gain of the amplifiers being adjustable in the opposite current directions for an optimum dematrixing of the stereo signal and being switchable by a factor of 2 for the reception of dual channel independent sound signals.

5 Claims, 2 Drawing Figures

CIRCUIT ARRANGEMENT FOR RECEIVING TWO MODULATING SIGNALS, MORE SPECIFICALLY FOR TELEVISION

BACKGROUND OF THE INVENTION

The invention relates to a circuit arrangement for receiving two modulating signals, more specifically for television, the first modulating signal ($K_1$) for example the stereo sum signal (L+R) or a first independent sound signal, being transmitted on a first carrier and the second modulating signal ($K_2$), for example the right channel signal (2R) or a second independent sound signal, being transmitted on a second carrier, the left channel signal being formed for stereo reception from the two modulating signals by means of an adder stage or a subtracting stage, respectively, and the gain for the sum signal being a factor 2 higher than the gain for the right channel signal, and, when two independent sound signals are received, the gain for the two modulating signals being equal.

The frequencies of the two carriers are located next to each other and are modulated by the first and the second modulating signal, respectively.

When two independent sound signals are transmitted, the information contained in the two modulating signals may be different, for example different languages, and may be processed at a user's option. The two modulating signals may alternatively form stereo signals, the first modulating signal $K_1$, for example, containing the sum (L+R) of the left-channel information and the right-channel information, while the second modulating signal $K_2$ contains twice the right-channel information (2R). So as to obtain the left-channel information, a correction by a factor of two and thereafter a substracting operation must be effected; the amplitudes must then be mutually equal to the best possible extent in order to prevent, as much as possible, the occurrence of crosstalk. From "Rundfunktechnische Mitteilungen," volume 1, 1979, page 12, FIG. 4, it is known to effect amplification and substraction with an operational amplifier, a mutual amplitude matching being effected by correcting one of the two modulating signals by a factor of 2. It has been found that crosstalk partly depends on the internal resistance of the signal source for the modulating signal $K_2$; this is particularly disadvantageous when integrated circuits are used, in which, depending on the design of the set, several signal sources may be integrated.

SUMMARY OF THE INVENTION

The invention has for its object to achieve adequate signal matching for the subtracting operation (dematrixing), independent of the external circuits and outside the signal path, for example by means of a direct current setting voltage.

According to the invention, a circuit arrangement of the type described in the opening paragraph, is characterized in that each of the two signals is passed through a variable-gain amplifier, the gains of the amplifiers being oppositely adjustable to achieve an optimum dematrixing of the stereo signal and being switchable by a factor of 2 for the reception of two sound signals.

In accordance with a further embodiment of the invention the adjustment of the gains of the amplifiers are also controllable in the same direction, so that a controllable volume setting may be performed. This may simplify the circuit arrangement. However, a minimum of crosstalk will then only be achieved at a certain volume setting. For simpler circuit designs on which less severe quality requirements are imposed, this need not be a disadvantage.

DESCRIPTION OF THE DRAWINGS

The invention will now be further described by way of example with reference to the accompanying drawings, in which.

DESCRIPTION OF THE PREFERRED EMBODIMENTS

Figure 1:
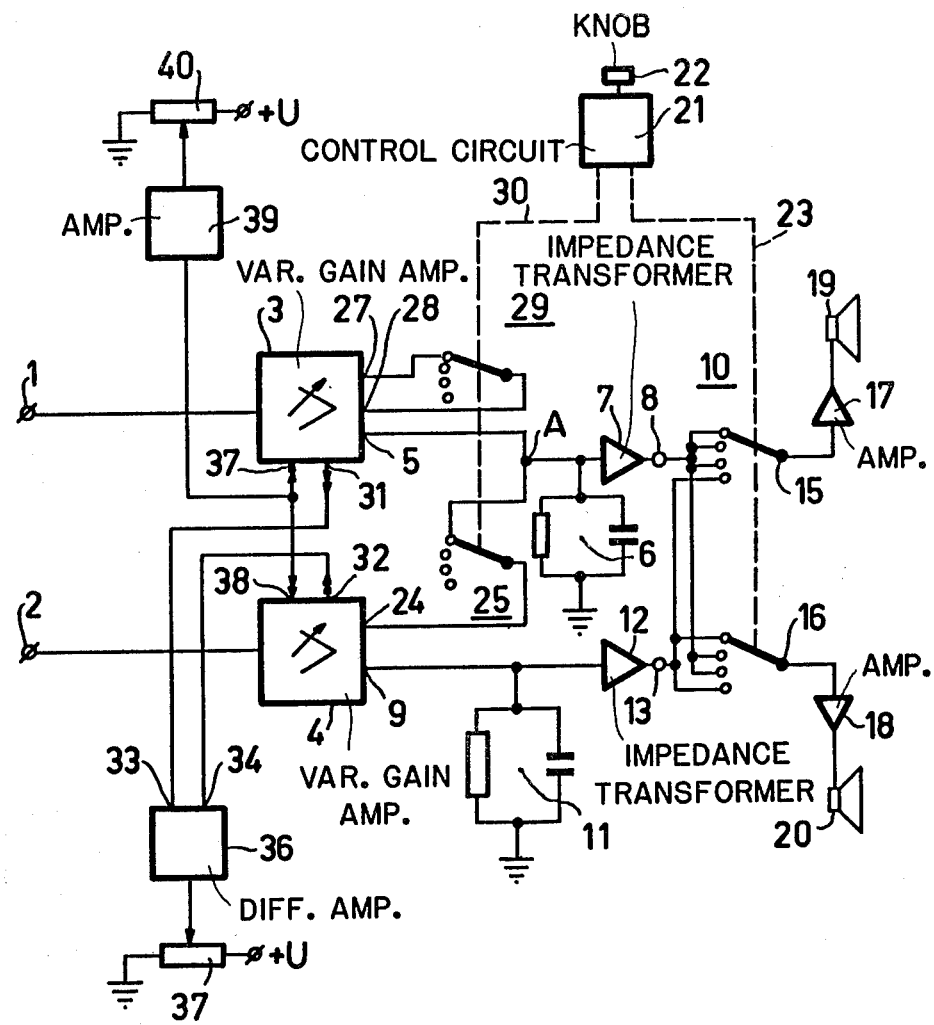
FIG. 1 shows a block-schematic circuit diagram of an embodiment in accordance with the invention.

The modulating signals $K_1$ and $K_2$, demodulated by a regenerated carrier, are applied to the inputs of two variable-gain amplifiers 3 and 4 via input terminals 1 and 2. The output 5 of the amplifier 3 is connected via a first deemphasis circuit 6 to the input of an impedance transformer 7, the output of which is connected to a first input terminal 8 of a modulating signal selection switch 10. An output 9 of the amplifier 4 is connected via a second deemphasis circuit 11 to the input of a second impedance transformer 12, the output of which is connected to a second input terminal 13 of the modulating signal selection switch 10. The two deemphasis circuits 6 and 11 are connected to ground.

The loudspeakers 19 and 20, respectively, are connected to output terminals 15 and 16 of the modulating signal selection switch 10 via further signal processing circuits, for example amplifiers 17 and 18, respectively. The switch 10 is a four-position change-over switch, the master contacts of which are mechanically coupled in known manner so that, considered from top to bottom in FIG. 1, in the first position the signals on the input terminals 8 and 13 flow, separate from each other, to the loudspeakers 19 and 20, respectively. In the second position they are mutually supplied from the terminal 8 for the monaural reproduction of a stereophonic signal. In the third position the same connection is provided in order to make the information signal $K_1$ which, for example, corresponds to the original sound of a film, audible via the two loudspeakers 19 and 20. In the fourth position the signal $K_2$ is applied from the terminal 13 to the two loudspeakers, for example for reproduction in a different language. The switch 10, the master contacts of which are connected to the output terminals 15 and 16, respectively, is operated by means of an control circuit 21, which can be adjusted to one of the four positions by means of a rotary knob 22. The operation of this circuit 21 is shown by the interrupted line 23 to the master contacts of the switch 10. The control circuit 21 may alternatively be in the form of an electronic drive.

For stereo reception, a signal is so applied from the output 24 of the amplifier 4 to the input of the impedance-transformer 7 via a change-over switch 25 that at the point A, the difference between the signals from the output 5 of the amplifier 3 and the signal from the output 24 of the amplifier 4 is formed. Simultaneously, the gain must, however, be adjusted. To this end, a connection is made between outputs 27 and 28 of the amplifier 3 by means of a change-over switch 29 in such a way that the gain of amplifier 3 is increased by a factor of 2.

It would of course alternatively be possible to reduce the gain of the amplifier 4 to 0.5 in a corresponding manner by means of a change-over switch.

The change-over switches 25 and 29 are also adjusted to the required position by the control circuit 21 shown by an interrupted line 30. Obviously, these switches are closed only in the event of stereo reception; in all the other receiving modes the gain of amplifiers 3 and 4 is not altered and the signals are not dematrixed.

The amplifiers 3 and 4, being cross-wise coupled differential amplifiers, are of such a construction that it is possible to change the gains thereof by applying direct current voltages, respectively, to the control inputs 31 and 32, respectively. These direct current voltages are supplied by the outputs 33 and 34 of a differential amplifier 36, the input signal of which is taken from the tap of a potentiometer 37, which is arranged between the supply source +U and ground. When the position of this tap is changed, the output values of the differential amplifier 36 change in the opposite direction and consequently the gains of the amplifiers 3 and 4 are changed in the opposite sense. By moving the tap on the potentiometer 37, a mutual match of the amplitudes of the modulating signals $K_1$ and $K_2$ applied to the impedance-transformer 7 in the event of stereo reception is possible for a minimum degrese of crosstalk.

The amplifiers 3 and 4 have further inputs 37 and 38, which are interconnected and connected to the output of a direct current amplifier 39. The input of the amplifier 39 is connected to the tap of a potentiometer 40, which is arranged between ground and +U. By adjusting the position of this tap, the gain of the amplifiers 3 and 4 can be changed in the equal sense. This enables a setting of the level for the two transmission channels. Optionally, adjusting the position of the tap of the potentiometer 40 may alternatively be used for adjusting the volume.

Figure 2:
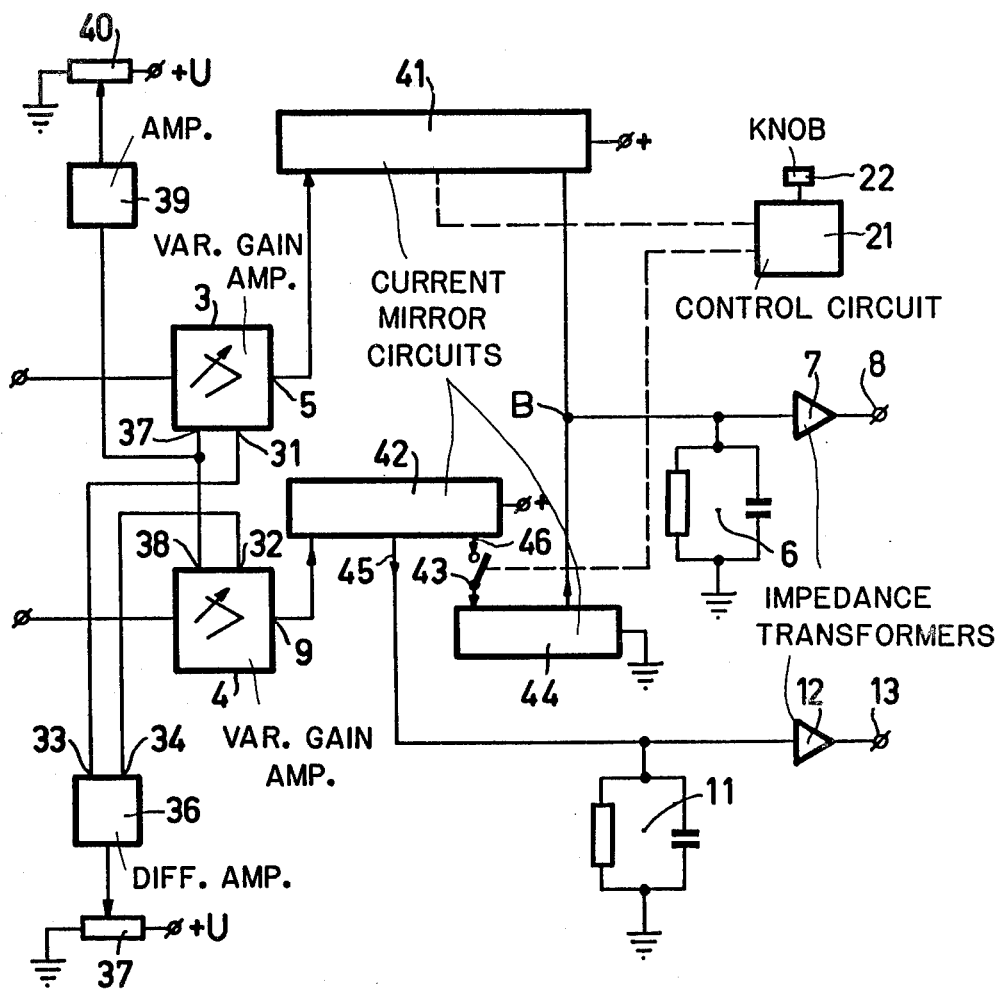
FIG. 2 shows a detailed block-schematic circuit diagram of another embodiment in accordance with the invention.

FIG. 2 shows another embodiment of the block circuit diagram of FIG. 1, corresponding components having been given the same reference numerals. The change-over switch 10 and the connections to the loudspeakers have been omitted. The output 5 of the amplifier 3 controls a current mirror circuit 41 and the output 9 of the amplifier 4 controls a current mirror circuit 42. The output of the current mirror circuit 41 is connected to a current node B, which is connected to the input of the impedance transformer 7. A first output 45 of the current mirror circuit 42 is connected to the input of the impedance transformer 12. A second output 46 of the current mirror circuit 42 is connected via a switch 43 to the input of a third current mirror circuit 44, whose output is also connected to the node B and, consequently, to the input of the impedance transformer 7, a signal corresponding to the difference between the stereo signals 2(L+R) and 2R, i.e. 2L, being then applied to the impedance transformer 7 to which the deemphasis element 6 is connected. The amplifiers 3 and 4 have equal gains, disregarding any small differences which were not fully compensated for by the matching operation; likewise, the input current-to-output current ratios of the current mirrors 41, 42 and 44 are usually the same. If, however, stereo sound is received and dematrixing must be effected, the transfer ratio in the current mirror circuit 41 becomes twice as high and the switch 43 is closed, after setting of the control circuit 21 by means of the rotary knob 22. Then the signal $K_2$ is also transferred to the node B from the output terminal 9 via the current mirror circuits 42 and 44, the desired dematrixing then taking place.

So, in the circuit shown in FIG. 2, the amplifiers 3 and 4 are not changed-over by the said factor of 2, but the relevant match is effected in the current mirror circuit 41, which is also used for decoupling the output. Furthermore, in the open condition, the switch 43 is not connected to the circuit of the signal $K_1$ but is only connected between the two current mirror circuits 42 and 44. This switch may then be included in one of the current mirror circuits, in which a transistor which transfers the signal $K_2$ is made non-conductive by means of a direct current switching quantity.

What is claimed is:

1. A circuit arrangement for receiving two modulating signals, more specifically for television, the first modulating signal ($K_1$), for example a stereo sum signal (L+R) or a first independent sound signal, being transmitted on a first carrier and the second modulating signal ($K_2$), for example a right channel signal (2R) or a second independent sound signal, being transmitted on a second carrier, the circuit arrangement having, for stereo reception, means for combining said two modulating signals to form a left channel signal, wherein the gain for the first modulating signal is a factor of 2 higher than the gain for the second modulating signal, and, when said two independent sound signals are received, the gains for said two modulating signals are equal, characterized in that said circuit arrangement further comprises a first and a second variable-gain amplifier through which said first and second modulating signals are passed, respectively, means for switchably adjusting the gain of one of said variable-gain amplifiers whereby for the reception of said two independent sound signals the gains of said variable amplifiers are substantially equal, while for stereo reception, the gain of said first variable-gain amplifier is a factor of 2 higher than the gain of said second variable-gain amplifier, and means for oppositely adjusting the gains of said variable-gain amplifiers to achieve an optimum combining of said two modulating signals in said combining means for optimum stereo reproduction.

2. A circuit arrangement as claimed in claim 1, characterized in that said circuit arrangement further comprises means for adjusting the gains of said variable-gain amplifiers in the same direction for amplitude matching, optionally for setting of the volume.

3. A circuit arrangement as claimed in claim 1 or 2, characterized in that said circuit arrangement further comprises a current mirror circuit coupling at least one of said variable-gain amplifiers to a respective output, and said switchable adjusting means comprises a further current mirror.

4. A circuit arrangement as claimed in claim 1 or 2, characterized in that said means for combining said two modulating signals comprises a circuit node to which signals from said variable-gain amplifiers are coupled.

5. A circuit arrangement as claimed in claim 3, characterized in that said means for combining said two modulating signals comprises a circuit node to which signals from said variable-gain amplifiers are coupled.

* * * * *